US009303574B2

(12) United States Patent
Nakamura et al.

(10) Patent No.: US 9,303,574 B2
(45) Date of Patent: Apr. 5, 2016

(54) CONTROL DEVICE OF ENGINE WITH SUPERCHARGER

(71) Applicant: AISAN KOGYO KABUSHIKI KAISHA, Obu-shi, Aichi (JP)

(72) Inventors: Takehide Nakamura, Handa (JP); Mamoru Yoshioka, Nagoya (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 0 days.

(21) Appl. No.: 14/566,210

(22) Filed: Dec. 10, 2014

(65) Prior Publication Data

US 2015/0198102 A1    Jul. 16, 2015

(30) Foreign Application Priority Data

Jan. 14, 2014  (JP) ................................. 2014-004024

(51) Int. Cl.

| F02B 37/12 | (2006.01) |
|---|---|
| F02D 43/00 | (2006.01) |
| F02M 25/07 | (2006.01) |
| F02D 41/00 | (2006.01) |
| F02B 37/16 | (2006.01) |
| F02D 41/12 | (2006.01) |
| F02B 29/04 | (2006.01) |

(52) U.S. Cl.
CPC ............ *F02D 41/0007* (2013.01); *F02B 37/16* (2013.01); *F02D 41/005* (2013.01); *F02D 41/12* (2013.01); *F02M 25/0709* (2013.01); *F02B 29/0406* (2013.01); *F02B 2037/162* (2013.01); *F02D 41/0065* (2013.01)

(58) Field of Classification Search
CPC ............... F02B 37/16; F02B 2037/162; F02B 29/0406; F02D 41/0007; F02D 41/005; F02D 41/12; F02M 25/0709
USPC .......................... 60/280, 287, 288, 602, 605.2
See application file for complete search history.

(56) References Cited

U.S. PATENT DOCUMENTS

| 7,654,086 B2* | 2/2010 | Gong | ...................... F02B 33/34 60/611 |
|---|---|---|---|
| 2004/0084031 A1* | 5/2004 | Ito | .......................... F02B 37/16 123/568.21 |

(Continued)

FOREIGN PATENT DOCUMENTS

| JP | A-2011-241798 | 12/2011 |
|---|---|---|
| JP | B2-5056953 | 10/2012 |

(Continued)

*Primary Examiner* — Audrey K Bradley
*Assistant Examiner* — Dapinder Singh
(74) *Attorney, Agent, or Firm* — Oliff PLC (57) ABSTRACT

An engine with a supercharger includes a low pressure loop EGR apparatus. An EGR passage having an inlet connected to an exhaust passage downstream of a turbine and an outlet connected to an intake passage upstream of a compressor. An intake bypass passage is provided to bypass the intake passage downstream of the compressor and the intake passage upstream of the compressor, with an ABV in the intake bypass passage. A throttle valve is closed during stop or deceleration operation of the engine. An electronic control unit (ECU) is configured such that, when the ECU determines based on an operation state of the engine that the EGR valve is in a valve-opened state and the engine is in deceleration operation from a supercharging region, the ECU controls an EGR valve to close and the ABV to open from a valve-closed state delayed from start of closing the EGR valve.

8 Claims, 5 Drawing Sheets

(56) References Cited

U.S. PATENT DOCUMENTS

2009/0223219 A1* 9/2009 Joergl .............. F02B 29/0406
60/602
2009/0260603 A1* 10/2009 Bucknell .............. F02B 33/34
123/564
2011/0252786 A1 10/2011 Okada

FOREIGN PATENT DOCUMENTS

| JP | A-2012-246891 | 12/2012 |
| JP | A-2013-189887 | 9/2013 |
| WO | WO 2011/111171 A1 | 9/2011 |

* cited by examiner

XX: Opening Degree of ABV

AA: Surge Not Generated
BB: Surge Generated

CONTROL DEVICE OF ENGINE WITH SUPERCHARGER

CROSS-REFERENCE TO RELATED APPLICATIONS

This application is based upon and claims the benefit of priority from the prior Japanese Patent Application No. 2014-004024 filed on Jan. 14, 2014, the entire contents of which are incorporated herein by reference.

BACKGROUND OF THE INVENTION

1. Field of the Invention

The present invention relates to an engine with a supercharger to increase intake pressure of the engine, more specifically to a control device of the engine with the supercharger including an exhaust gas recirculation apparatus configured to return part of exhaust gas of the engine to the engine and controlling the exhaust gas recirculation apparatus and others in accordance with an operating condition of the engine.

2. Related Art

Heretofore, this type of technique is, for example, applied to an engine for an automobile. An exhaust gas recirculation (EGR) apparatus is arranged to allow part of exhaust gas discharged after combustion from a combustion chamber of the engine to an exhaust passage to flow as EGR gas into an intake passage via an EGR passage, so that the exhaust gas is mixed with intake air flowing in the intake passage and returns to the combustion chamber. The EGR gas flowing in the EGR passage is regulated by an EGR valve provided in the EGR passage. This EGR can reduce mainly nitrogen oxide (NOx) in the exhaust gas and improve fuel consumption during a partial load operation of the engine.

Exhaust gas from the engine contains no oxygen or is in an oxygen lean state. Thus, when part of the exhaust gas is mixed with the intake air by EGR, the oxygen concentration of the intake air decreases. In a combustion chamber, therefore, fuel burns in a low oxygen concentration. Thus, a peak temperature during combustion decreases, thereby suppressing generation of NOx. In a gasoline engine, intake negative pressure is increased without increasing the content of oxygen in the intake air by EGR, so that it is possible to reduce pumping loss of the engine.

Herein, recently, it is conceivable to perform EGR in an entire operating region of the engine in order to further improve fuel consumption. Realization of high EGR rates is thus demanded. To realize the high EGR rates, it is necessary for conventional arts to increase an internal diameter of an EGR passage or increase an opening area of a flow passage provided by a valve element and a valve seat of an EGR valve.

Meanwhile, it is also known to provide the EGR apparatus to an engine equipped with a supercharger. Japanese Patent No. JP5056953B2 (WO2011/111171A1) discloses a supercharger-equipped engine of this type and a low pressure loop EGR apparatus. The supercharger includes a turbine placed in an exhaust passage and a compressor placed in an intake passage and driven by the turbine. This low pressure loop EGR apparatus includes an EGR passage provided between the exhaust passage downstream of the turbine and the intake passage upstream of the compressor, and an EGR valve provided in the EGR passage. Further, an intake bypass passage is provided between the intake passage downstream of the compressor and the intake passage upstream of the compressor, and provided with an air bypass valve (ABV). When the engine is in deceleration operation (when a throttle valve provided in the intake passage is closed) from a supercharging region in which the supercharger is operated, the ABV is opened to prevent generation of surge and concurrently the EGR valve is closed. Thus, the pressure in the intake passage downstream of the compressor is decreased and the EGR gas flowing in the intake passage is reduced so as to reduce the EGR gas flowing in the intake bypass passage and the compressor. Thereby, the EGR gas is prevented from being highly concentrated. Herein, the "surge" means a phenomenon in which gas flowing in the compressor of the supercharger and the intake passage is strongly oscillated in the flow direction. In a case that this oscillation goes extreme, that could cause flow back of the gas from an outlet to an inlet of the compressor, intermittent unusual sound, and oscillation of pipes of the compressor and the intake passage.

SUMMARY OF INVENTION

Problems to be Solved by the Invention

However, in a control device disclosed in Japanese Patent No. JP5056953B2 (WO2011/111171A1), a valve-opening speed and a valve-closing speed of the EGR valve tend to be slow when the EGR valve is designed large in size according to high EGR rates. Accordingly, there is a case that closing the EGR valve is not completed in a process of opening the ABV, and the air including the EGR gas could flow among the intake passage, the compressor, and the intake bypass passage. This could cause high concentration of EGR gas included in the flowing air. As a result, during deceleration of the engine, there is a possibility of generating condensed water around the intake bypass passage and the ABV due to the highly concentrated residual EGR gas. Alternately, if the highly concentrated residual EGR gas is taken into the combustion chamber when the engine starts, the engine could be misfired.

In response to this, there is suggested a high output of a motor of an EGR valve in order to promote closing speed of the EGR valve. However, this requires enlargement of the EGR valve or increase in cost.

The present invention has been made in view of the above circumstances and has a purpose to provide a control device of an engine with a supercharger capable of effectively preventing surge in the supercharger by use of an intake bypass passage and an air bypass valve during deceleration operation of the engine, and capable of preventing increase in concentration of exhaust recirculation gas around the intake bypass passage and the air bypass valve.

Means of Solving the Problems

To achieve the above purpose, one aspect of the invention provides a control device of an engine with a supercharger, the engine including: the supercharger provided between an intake passage and an exhaust passage of the engine and configured to increase intake pressure in the intake passage, the supercharger including a compressor placed in the intake passage, a turbine placed in the exhaust passage, and a rotary shaft connecting the compressor and the turbine so that the compressor and the turbine are integrally rotatable; an exhaust gas recirculation apparatus including an exhaust recirculation passage configured to allow part of exhaust gas discharged from a combustion chamber of the engine to the exhaust passage to flow as exhaust recirculation gas to the intake passage and return to the combustion chamber and an exhaust recirculation valve configured to regulate a flow of the exhaust recirculation gas in the exhaust recirculation passage, the exhaust recirculation passage having an inlet connected to the exhaust passage downstream of the turbine and an outlet connected to the intake passage upstream of the compressor; an intake regulating valve configured to regulate intake amount in the intake passage; an intake bypass passage configured to bypass the intake passage downstream of the compressor and the intake passage upstream of the compressor; an air bypass valve configured to open and close the intake bypass passage; an operating condition detecting unit configured to detect operating condition of the engine; and a control unit configured to control at least the exhaust recirculation valve and the air bypass valve based on the detected operating condition; the intake regulating valve being configured to open during acceleration operation or during steady operation of the engine and to close during stop operation or during deceleration operation of the engine, wherein the control unit is configured such that, when the control unit determines based on the detected operating condition that the exhaust recirculation valve is in a valve-opened state and that the engine is in the deceleration operation from a supercharging region where the supercharger is operated, the control unit controls the exhaust recirculation valve to close and controls the air bypass valve to open from a closed state with a delay from start of closing the exhaust recirculation valve.

Advantageous Effects of Invention

According to the present invention, as well as effectively preventing surge of the supercharger by use of the intake bypass passage and the air bypass valve during deceleration operation of the engine, it can prevent increase in concentration of the exhaust recirculation gas around the intake bypass passage and the air bypass valve.

DESCRIPTION OF EMBODIMENTS

A detailed description of an embodiment of a control device of an engine with a supercharger embodying the present invention will now be given referring to the accompanying drawings.

Figure 1:
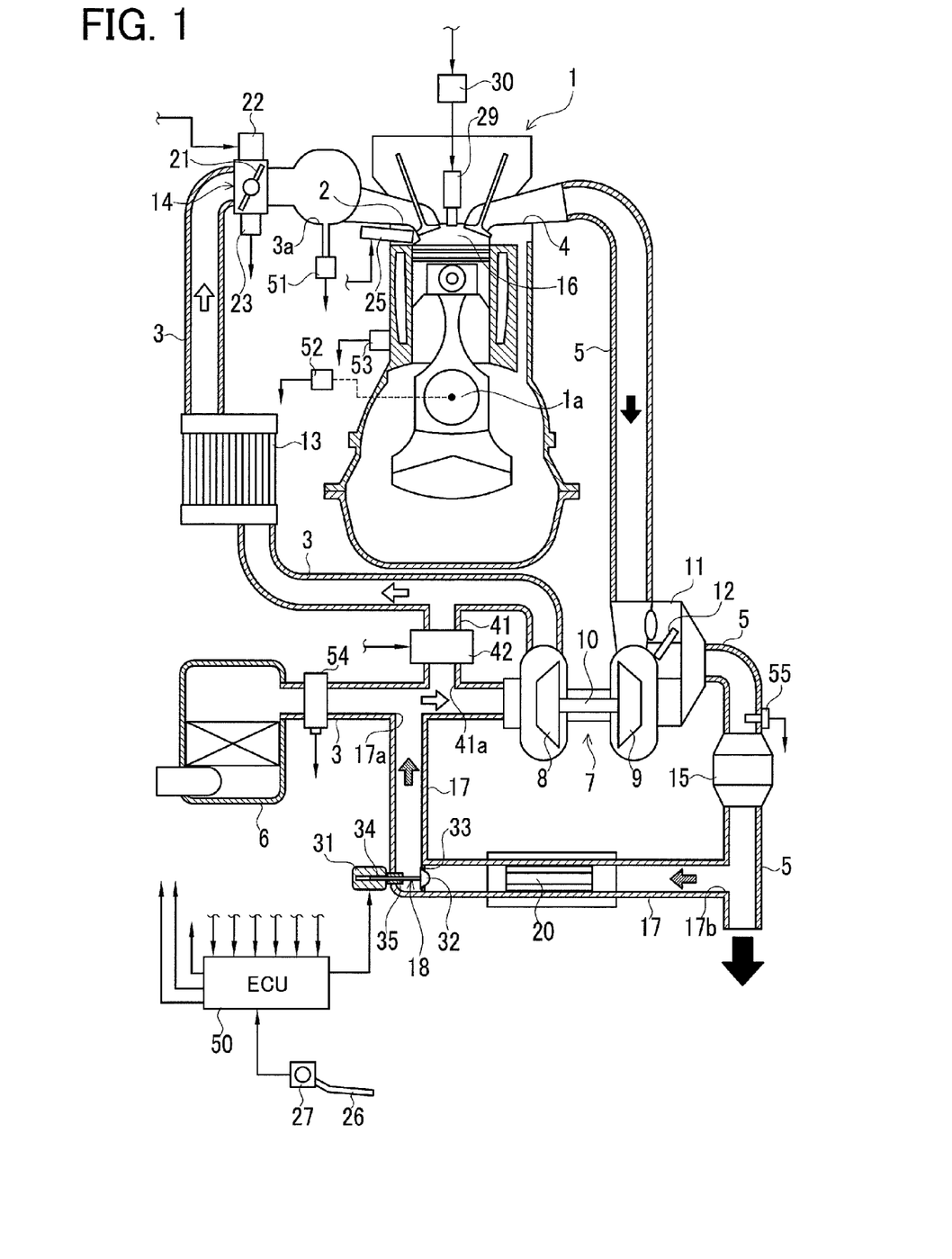
FIG. 1 is a schematic configuration view showing a gasoline engine system with a supercharger in an embodiment.

FIG. 1 is a schematic configuration view showing a gasoline engine system with a supercharger in the present embodiment. This engine system includes a reciprocating-type engine 1. This engine 1 has an intake port 2 connected to an intake passage 3 and an exhaust port 4 connected to an exhaust passage 5. An air cleaner 6 is provided at an inlet of the intake passage 3. In the intake passage 3 downstream of the air cleaner 6, a supercharger 7 is placed in a position between a portion of the intake passage 3 and a portion of the exhaust passage 5 to increase the pressure of intake air in the intake passage 3.

The supercharger 7 includes a compressor 8 placed in the intake passage 3, a turbine 9 placed in the exhaust passage 5, and a rotary shaft 10 connecting the compressor 8 and the turbine 9 so that they are integrally rotatable. The supercharger 7 is configured to rotate the turbine 9 with exhaust gas flowing in the exhaust passage 5 and integrally rotate the compressor 8 through the rotary shaft 10 in order to increase the pressure of intake air in the intake passage 3, that is, carry out supercharging.

In the exhaust passage 5, adjacent to the supercharger 7, an exhaust bypass passage 11 is provided by detouring around the turbine 9. In this exhaust bypass passage 11, a waste gate valve 12 is placed. This waste gate valve 12 regulates exhaust gas allowed to flow in the exhaust bypass passage 11. Thus, a flow rate of exhaust gas to be supplied to the turbine 9 is regulated, thereby adjusting the rotary speeds of the turbine 9 and the compressor 8, and adjusting supercharging pressure of the supercharger 7.

In the intake passage 3, an intercooler 13 is provided between the compressor 8 of the supercharger 7 and the engine 1. This intercooler 13 serves to cool intake air having the pressure increased by the compressor 8 and hence a high temperature, down to an appropriate temperature. A surge tank 3a is provided in the intake passage 3 between the intercooler 13 and the engine 1. Further, an electronic throttle device 14 this is an electrically-operated throttle valve is placed in the intake passage 3 downstream of the intercooler 13 but upstream of the surge tank 3a. The throttle device 14 includes a butterfly-shaped throttle valve 21 placed in the intake passage 3, a DC motor 22 to drive the throttle valve 21 to open and close, a throttle sensor 23 to detect an opening degree or position (a throttle opening degree) TA of the throttle valve 21. The throttle device 14 is configured so that the throttle valve 21 is driven by the DC motor 22 to open and close according to operation of an accelerator pedal 26 by a driver to adjust the opening degree of the throttle valve 21. In this embodiment, the throttle device 14 corresponds to one example of an intake regulating valve of the invention. In the exhaust passage 5 downstream of the turbine 9, a catalytic converter 15 is provided as an exhaust catalyst to clean exhaust gas.

In the intake passage 3, adjacent to the supercharger 7, an intake bypass passage 41 is provided detouring around the compressor 8. Namely, the intake bypass passage 41 is configured to bypass a portion between the intake passage 3 downstream of the compressor 8 and the intake passage 3 upstream of the compressor 8. In this intake bypass passage 41, an air bypass valve (hereinafter, referred as ABV) 42 is provided to open and close the passage 41. The ABV 42 regulates intake air flowing in the intake bypass passage 41, and thereby a pressure difference between pressure at an inlet side and pressure at an outlet side of the compressor 8 is reduced so as to prevent generation of surge.

The engine 1 is further provided with an injector 25 to inject and supply fuel into a combustion chamber 16. The injector 25 is configured to be supplied with the fuel from a fuel tank (not shown). The engine 1 is further provided with an ignition plug 29 in each cylinder. Each of the ignition plugs 29 ignites in response to high voltage output from an igniter 30. An ignition timing of each ignition plug 29 is determined by output timing of the high voltage from the igniter 30. The ignition plugs 29 and the igniter 30 constitute an ignition device.

In the present embodiment, the engine 1 is provided with an EGR apparatus. The EGR apparatus includes an exhaust gas recirculation (EGR) passage 17 allowing part of exhaust gas discharged from the combustion chamber 16 of the engine 1 to the exhaust passage 5 to flow in the intake passage 3 as EGR gas and return to the combustion chamber 16, and an exhaust gas recirculation (EGR) valve 18 placed in the EGR passage 17 to regulate an exhaust gas flow rate in the EGR passage 17. In this embodiment, the EGR apparatus is a low pressure loop system and the EGR passage 17 is provided to extend between the exhaust passage 5 downstream of the catalytic converter 15 and the intake passage 3 upstream of the compressor 8. Specifically, an outlet 17a of the EGR passage 17 is connected to the intake passage 3 upstream of the compressor 8 and upstream of an outlet 41a of the intake bypass passage 41 to allow a part of exhaust gas flowing in the exhaust passage 5 to flow as EGR gas into the intake passage 3 and to return to the combustion chamber 16. An inlet 17b of the EGR passage 17 is connected to the exhaust passage 5 downstream of the catalytic converter 15. In the EGR passage 17, an EGR cooler 20 is provided to cool EGR gas flowing in the EGR passage 17. In the present embodiment, the EGR valve 18 is located in the EGR passage 17 downstream of the EGR cooler 20.

As shown in FIG. 1, the EGR valve 18 is configured as a poppet valve and a motor-operated valve. Specifically, the EGR valve 18 is provided with a valve element 32 to be driven by a DC motor 31. The valve element 32 has an almost conical shape and is configured to seat on a valve seat 33 provided in the EGR passage 17. The DC motor 31 includes an output shaft 34 arranged to reciprocate in a straight line (stroke movement). The valve element 32 is fixed at a leading end of the output shaft 34. This output shaft 34 is supported in a housing defining the EGR passage 17 through a bearing 35. The stroke movement of the output shaft 34 of the DC motor 31 is performed to adjust the opening degree of the valve element 32 with respect to the valve seat 33. The output shaft 34 of the EGR valve 18 is provided to be able to make stroke movement by a predetermined stroke between a fully closed position in which the valve element 32 seats on the valve seat 33 and a fully opened position in which the valve element 32 contacts with the bearing 35. In the present embodiment, an opening area of the valve seat 33 is set larger than a conventional one in order to achieve high EGR rates. Accordingly, the valve element 32 is also designed with large size.

In the present embodiment, for respectively executing fuel injection control, ignition timing control, intake amount control, EGR control, and other controls according to the operating condition of the engine 1, an electronic control unit (ECU) 50 controls the injector 25, the igniter 30, the DC motor 22 of the electronic throttle device 14, the motor 31 of the EGR valve 18, and the ABV 42 according to the operating condition of the engine 1. The ECU 50 includes a central processing unit (CPU), various memories that store a predetermined control program and others in advance and that temporarily store computational results and others of the CPU, and an external input circuit and an external output circuit connected to each of them. In the present embodiment, the ECU 50 is one example of a control unit of the invention. To the external output circuit, there are connected the igniter 30, the injector 25, the DC motor 22, and the DC motor 31, and the ABV 42. To the external input circuit, there are connected the throttle sensor 23 and various sensors 27 and 51 to 55 to transmit various engine signals to the external input circuit. These sensors 23, 27, and 51 to 55 correspond to one example of an operating condition detecting unit to detect the operating condition of the engine 1.

The various sensors include the accelerator sensor 27, the intake pressure sensor 51, the rotation speed sensor 52, the water temperature sensor 53, the air flow meter 54, and the air-fuel ratio sensor 55 as well as the throttle sensor 23. The accelerator sensor 27 detects an accelerator opening degree ACC which is an operation amount of the accelerator pedal 26. The intake pressure sensor 51 detects intake pressure PM in the surge tank 3a. That is, the intake pressure sensor 51 is configured to detect intake pressure PM in the surge tank 3a downstream of the throttle valve 21. The rotation speed sensor 52 detects the rotation angle (crank angle) of a crank shaft 1a of the engine 1 and also detects changes in crank angle as the rotation speed (engine rotation speed) NE of the engine 1. The water temperature sensor 53 detects the cooling water temperature THW of the engine 1. The air flow meter 54 detects a flow amount Ga of intake air flowing in the intake passage 3 directly downstream of the air cleaner 6. The air-fuel ratio sensor 55 is placed in the exhaust passage 5 directly upstream of the catalytic converter 15 to detect an air-fuel ratio A/F in the exhaust gas.

In the present embodiment, the ECU 50 is configured to control the EGR valve 18 in the whole operating region of the engine 1 to carry out EGR according to the operating condition of the engine 1. On the other hand, the ECU 50 is arranged to normally control the EGR valve 18 to open based on an operating condition which is detected during acceleration operation or steady operation of the engine 1 and to control the EGR valve 18 to fully close during stop operation, idle operation, or deceleration operation of the engine 1.

In the present embodiment, the ECU 50 is arranged to control the electronic throttle device 14 based on the accelerator opening degree ACC in order to drive the engine 1 in response to requests from a driver. The ECU 50 is further arranged to control the electronic throttle device 14 to open based on the accelerator opening degree ACC during acceleration operation or steady operation of the engine 1 and to control the electronic throttle device 14 to close during stop or deceleration operation of the engine 1. Accordingly, the throttle valve 21 is opened during acceleration operation or steady operation of the engine 1, whereas it is fully closed during stop or deceleration operation of the engine 1.

Herein, in the EGR apparatus of the present embodiment, the valve opening speed and the valve closing speed of the EGR valve 18 tends to be slow due to the increase in size of the EGR valve 18 according to high EGR rates. Further, during deceleration operation of the engine 1 from the supercharging region in which the supercharger 7 is operated, the electronic throttle device 14 (throttle valve 21) is closed and the EGR valve 18 is closed, but the ABV 42 is opened from the valve-closed state in order to prevent generation of surge in the supercharger 7. If the EGR valve 18 is closed with a delay from a process of opening the ABV 42, the EGR gas flowing from the outlet 17a of the EGR passage 17 to the intake passage 3 is mixed and circulated with the air circulating between the intake passage 3, the compressor 8, and the intake bypass passage 41. This repeated circulation of the EGR gas could cause high concentration of the EGR gas. As a consequence, the highly concentrated EGR gas could lead to generation of condensed water around the intake bypass passage 41 and the ABV 42 during stop of the engine 1, or the highly concentrated residual EGR gas could cause misfire on the engine 1 in start of the engine 1. In order to prevent increase in concentration of the residual EGR gas, in the present embodiment, the ECU 50 is configured to carry out intake bypass control during deceleration operation of the engine 1 as mentioned below.

Figure 2:
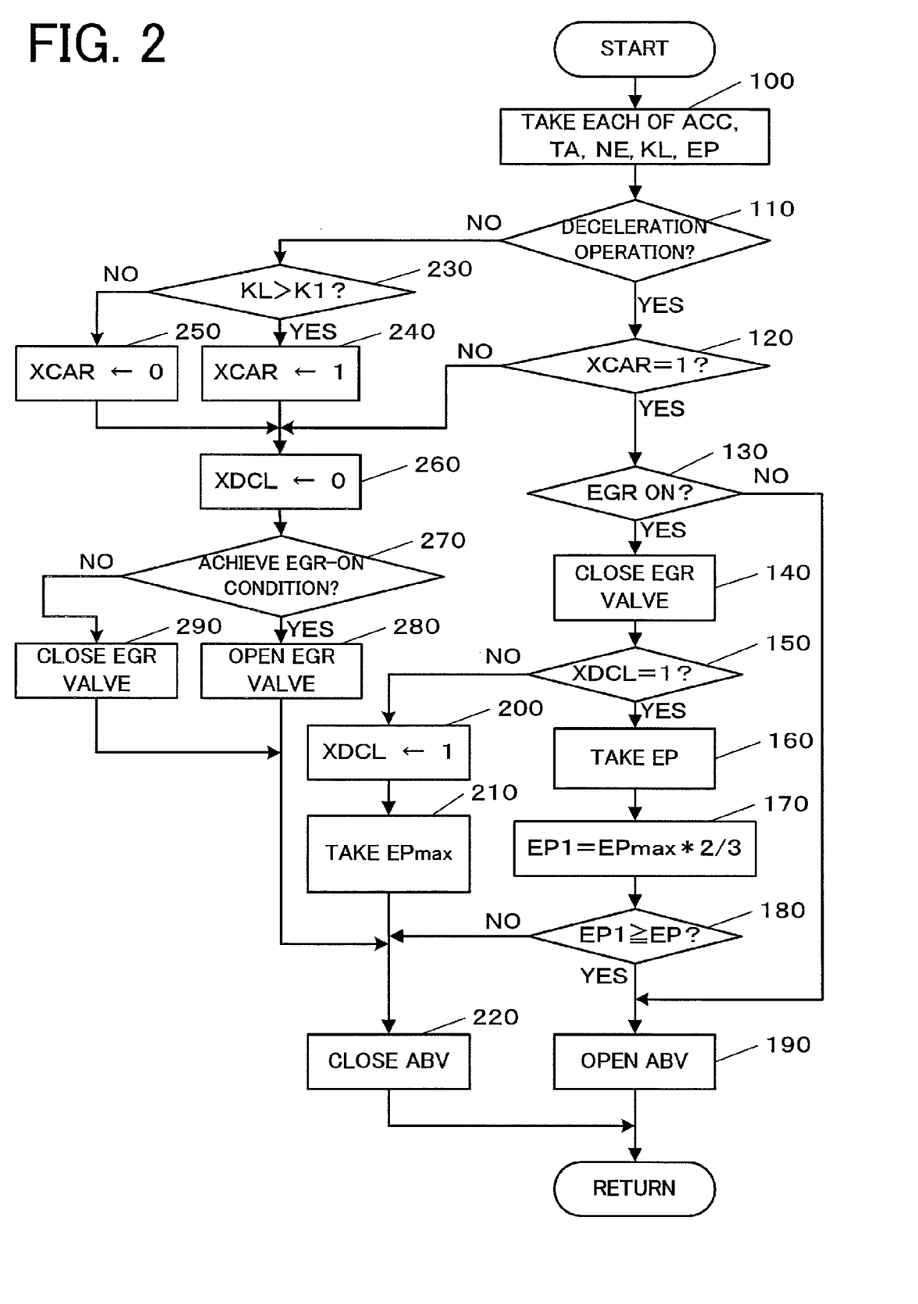
FIG. 2 is a flowchart showing one example of processing details of intake bypass control in the embodiment.

FIG. 2 is a flowchart showing one example of processing details of the intake bypass control. When the processing proceeds to this routine, the ECU 50 first takes or reads the accelerator opening degree ACC, the throttle opening degree TA, the engine rotation speed NE, the engine load KL, and the opening degree EP of the EGR valve 18 in Step 100. Herein, the ECU 50 can obtain the engine load KL from the engine rotation speed NE and the intake pressure PM. Further, the ECU 50 can obtain the opening degree EP of the EGR valve 18 from a command value of opening the EGR valve 18.

In Step 110, the ECU 50 determines whether or not the engine 1 is in deceleration operation. The ECU 50 can, for example, make this determination based on changes in the accelerator opening degree ACC. If this determination result is affirmative (YES), the ECU 50 shifts the process to Step 120. If this determination result is negative (NO), the ECU 50 shifts the process to Step 230.

In Step 120, the ECU 50 determines whether or not a supercharging region flag XCAR is "1." This supercharging region flag XCAR is arranged to be "1" when the operation condition of the engine 1 is in the supercharging region, and the flag XCAR is arranged "0" when the operation condition is not in the supercharging region. If this determination result is affirmative (the flag XCAR is "1"), the ECU 50 shifts the process to Step 130. If the determination result is negative (the flag XCAR is arranged "0"), the ECU 50 shifts the process to Step 260.

In Step 130, the ECU 50 determines whether or not EGR is on, namely, determines whether or not EGR is being performed. If this determination result is affirmative, the ECU 50 shifts the process to Step 140. If the determination result is negative, the ECU 50 shifts the process to Step 190.

In Step 140, the ECU 50 controls the EGR valve 18 to close because EGR is being performed and the engine 1 is in deceleration operation.

In Step 150, the ECU 50 determines whether or not a deceleration flag XDCL is "1." This deceleration flag XDCL is arranged to be "1" when the engine 1 is determined to have been in the first deceleration operation and arranged to be "0" when the engine 1 is not in deceleration operation. If the determination result is negative, the ECU 50 judges the deceleration operation of this time is as the first deceleration operation and shifts the process to Step 200. If the determination result is affirmative, the ECU 50 judges the deceleration operation of this time as after the first operation and shifts the process to Step 160.

In Step 200, the ECU 50 adjusts the deceleration flag XDCL to "1." Next in Step 210, the ECU 50 takes the opening degree EP of the EGR valve 18 at that time as a maximum opening degree EPmax.

In Step 220, the ECU 50 controls the ABV 42 to close and returns the process to Step 100.

On the other hand, in Step 160, the ECU 50 takes the current opening degree EP of the EGR valve 18. Then, in Step 170, the ECU 50 obtains an amount two thirds of the maximum opening degree EPmax as a determination opening degree EP1. The amount "two thirds" of the maximum degree is one example for the determination opening degree and the numerical value may be appropriately changed.

In Step 180, the ECU 50 determines whether or not the current opening degree EP is equal to or less than the determination opening degree EP1. If this determination result is affirmative, the ECU 50 shifts the process to Step 190. If the determination result is negative, the ECU 50 shifts the process to Step 220.

In Step 190, the ECU 50 controls the ABV 42 to open and shifts the process to Step 100 since the opening degree of the EGR valve 18 is determined to be equal or less than the determination opening degree EP1. In the present embodiment, when the ECU 50 concludes that the engine 1 is in deceleration operation, the ECU 50 is arranged to start opening the ABV 42 before completion of valve closing of the electronic throttle device 14 (throttle valve 21).

On the other hand, in Step 230 proceeding from Step 110, the ECU 50 determines whether or not the engine load KL is larger than the predetermined value K1. Herein, the predetermined value K1 may be, for example, "80%." If this determination result is affirmative, the ECU 50 shifts the process to Step 240. If the determination result is negative, the ECU 50 shifts the process to Step 250.

In Step 240, since the operation condition of the engine 1 is determined to be in the supercharging region, the ECU 50 adjusts the supercharging region flag XCAR to "1," and then shifts the process to Step 260.

In Step 250, since the operation condition of the engine 1 is not in the supercharging region, the ECU 50 adjusts the supercharging region flag XCAR to "0," and then shifts the process to Step 260.

Then, in Step 260 proceeding from either one of Steps 120, 240, or 250, the ECU 50 adjusts the deceleration flag XDCL to "0" since the engine 1 is not in deceleration operation.

In Step 270, the ECU 50 determines whether or not the EGR-on condition is achieved, i.e., the requirement to carry out EGR is achieved. If this determination result is affirmative, the ECU 50 shifts the process to Step 280. If the determination result is negative, the ECU 50 shifts the process to Step 290.

In Step 280, the ECU 50 controls the EGR valve 18 to open and shifts the process to Step 220.

In Step 290, on the other hand, the ECU 50 controls the EGR valve 18 to close and shifts the process to Step 220.

According to the above intake bypass control, the ECU 50 is arranged to control the EGR valve 18 to close when the ECU 50 determines based on the detected operation condition of the engine 1 that the EGR valve 18 is in a valve-opened state and that the engine 1 is in deceleration operation from the supercharging region in which the supercharger 7 is operated. The ECU 50 further controls the ABV 42 to open from a valve-closed state with a delay from start of closing the EGR valve 18. Moreover, when the ECU 50 determines that the engine 1 is in deceleration operation, the ECU 50 is arranged to start opening the ABV 42 before completion of closing the electronic throttle device 14 (throttle valve 21). Further, the ECU 50 is arranged to control the EGR valve 18 to close and control the ABV 42 to start opening when the opening degree of the EGR valve 18 is equal to or less than two thirds of the preceding valve-opened state.

Figure 3:
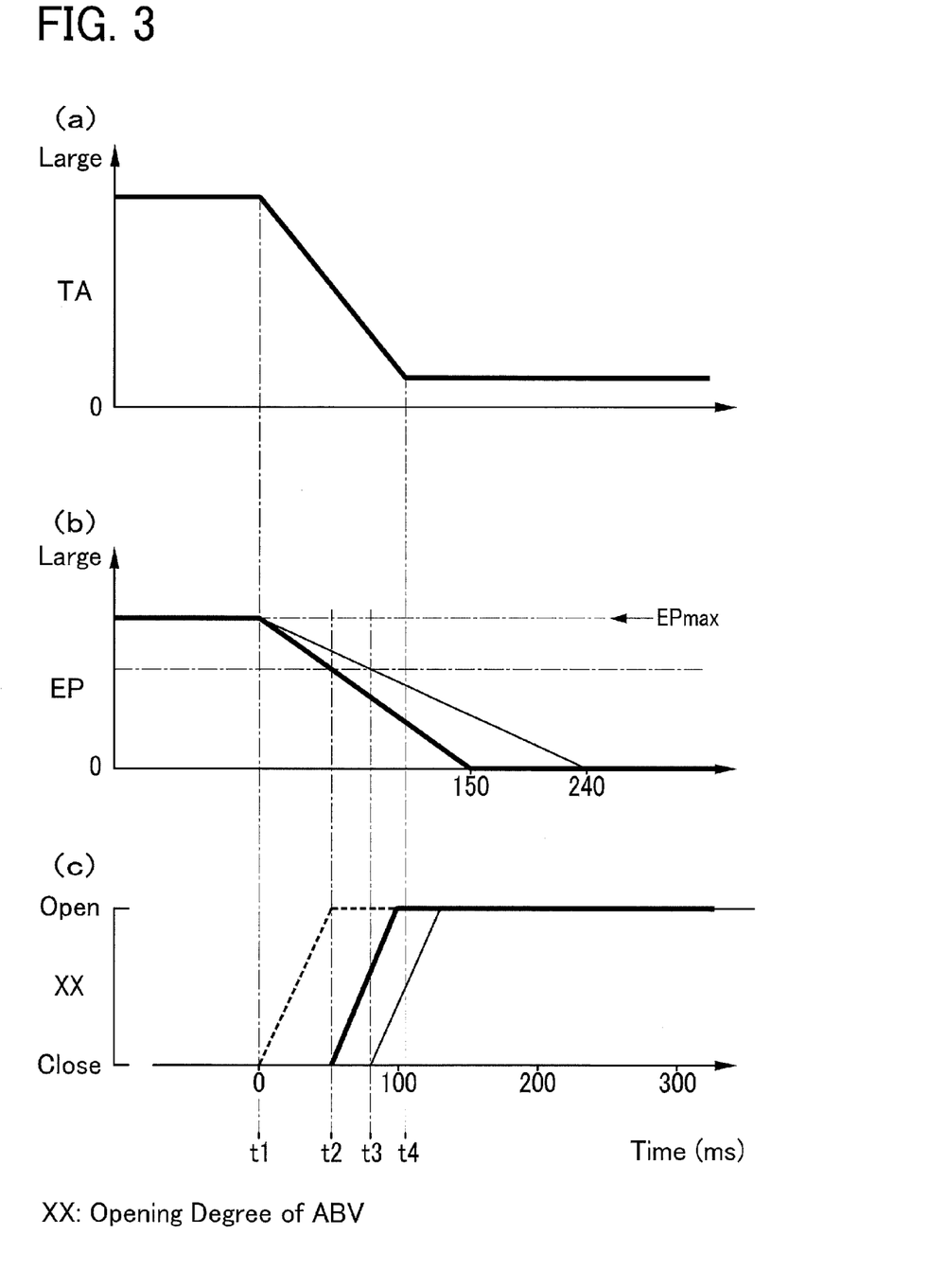
FIG. 3 is a time chart showing behaviors of: (a) a throttle opening degree; (b) an opening degree of an EGR valve; and (c) an opening degree of an ABV during deceleration operation of an engine in the embodiment.

FIG. 3 is a time chart showing behaviors of (a) the throttle opening degree TA, (b) the opening degree EP of the EGR valve 18, and (c) the opening degree of ABV 42 during deceleration operation of the engine 1. At a time t1, as shown in FIG. 3 (a), the throttle valve 21 starts to close (the throttle opening degree TA starts to decrease), and the engine 1 enters into the deceleration operation. Concurrently, as shown in FIG. 3 (b) with a bold or solid line, the EGR valve 18 starts to close (the opening degree EP of the EGR valve 18 starts to decrease). The bold line in FIG. 3 (b) indicates one example that the valve-closing speed of the EGR valve 18 is relatively rapid, and the solid line indicates one example that the valve-closing speed of the EGR valve 18 is relatively slow. As shown in FIG. 3 (c) with a broken line, conventionally, the ABV 42 starts to open from the valve-closed state (the opening degree of the ABV 42 starts to increase) at the same time with t1. On the contrary, in the present embodiment, the ABV 42 starts to open from the closed state (the opening degree of the ABV 42 starts to increase) at a time t2 slightly delayed from the time t1 as shown in FIG. 3 (c) with a bold line. This timing t2 is, as shown in FIG. 3 (b) with the bold line, the time when the opening degree of the EGR valve 18 is reduced to two thirds of the opening degree EP of the valve-opened state (the maximum opening degree EPmax). After that, the throttle valve 21 terminates valve closing at a time t4 (decrease in the throttle opening degree TA is terminated). The time t2 when the ABV 42 starts to open precedes this time t4.

In the case that the valve-closing speed of the EGR valve 18 is relatively slow, as shown in FIG. 3 (b) with the solid line, the ABV 42 starts to open at a time t3 since the opening degree of the EGR valve 18 becomes two thirds of the maximum opening degree EPmax at the time t3 later than the time t2.

According to the above explained control device of the engine with the supercharger in the present embodiment, when the ECU 50 determines that EGR is being performed and that the engine 1 is in deceleration operation from the supercharging region, the ECU 50 controls the EGR valve 18 to close from the valve-opened state and controls the ABV 42 to open from the valve-closed state with a delay from start of closing the EGR valve 18. Accordingly, during deceleration operation of the engine 1, as for EGR gas flowing from the outlet 17a of the EGR passage 17 to the intake passage 3 before completion of closing the EGR valve 18, the circulation flow rate is reduced while the EGR gas flows successively through the intake passage 3 upstream of the compressor 8 to the compressor 8 and through the intake passage 3 downstream of the compressor 8, the intake bypass passage 41, and the intake passage 3 upstream of the compressor 8. Thereby, during deceleration operation of the engine 1, surge in the supercharger 7 can be effectively prevented by use of the intake bypass passage 41 and the ABV 42, and the EGR gas around the intake bypass passage 41 and the ABV 42 can be prevented from being highly concentrated. As a result, after stop of the engine 1, it is possible to prevent generation of condensed water due to highly concentrated residual EGR gas surroundings of the intake bypass passage 41 and the ABV 42. Further, when starting the engine 1, it is possible to prevent misfire of the engine 1 due to the highly concentrated residual EGR gas which is taken into the combustion chamber 16.

In the present embodiment, the ABV 42 starts to open before completion of closing the throttle valve 21, and thereby part of the EGR gas flowing from the outlet 17a of the EGR passage 17 to the intake passage 3 before completion of closing the EGR valve 18 could flow downstream of the throttle valve 21 before completion of closing the throttle valve 21. Thus, it is further preventable to cause high concentration of the EGR gas around the intake bypass passage 41 and the ABV 42.

In the present embodiment, delay in start of the ABV 42 opening is set to be the time when the opening degree of the EGR valve 18 after the EGR valve 18 starts to close becomes two thirds of the maximum opening degree EPmax of the valve-opened state. Owing to this, circulation of the EGR gas, which flows successively through the intake passage 3 upstream of the compressor 8 to the compressor 8 and through the intake passage 3 downstream of the compressor 8, the intake bypass passage 41, and the intake passage 3 upstream of the compressor 8, is suppressed to the most extent, and the supercharging pressure is reduced. Therefore, as well as effectively restraining high concentration of the EGR gas around the intake bypass passage 41 and the ABV 42, generation of surge in the supercharger 7 can be prevented at most.

In the present embodiment, when the ABV 42 is opened, intake air is let flow from the intake passage 3 downstream of the compressor 8 to the intake passage 3 upstream of the compressor 8 via the intake bypass passage 41. The outlet 41a of the intake bypass passage 41 is connected to the intake passage 3 downstream of the outlet 17a of the EGR passage 17, and thereby the EGR gas flown from the outlet 17a of the EGR passage 17 is hard to be mixed with air flown from the outlet 41a of the intake bypass passage 41. Thus, it can be further prevented that the EGR gas around the intake bypass passage 41 and the ABV 42 is to be highly concentrated.

Figure 4:
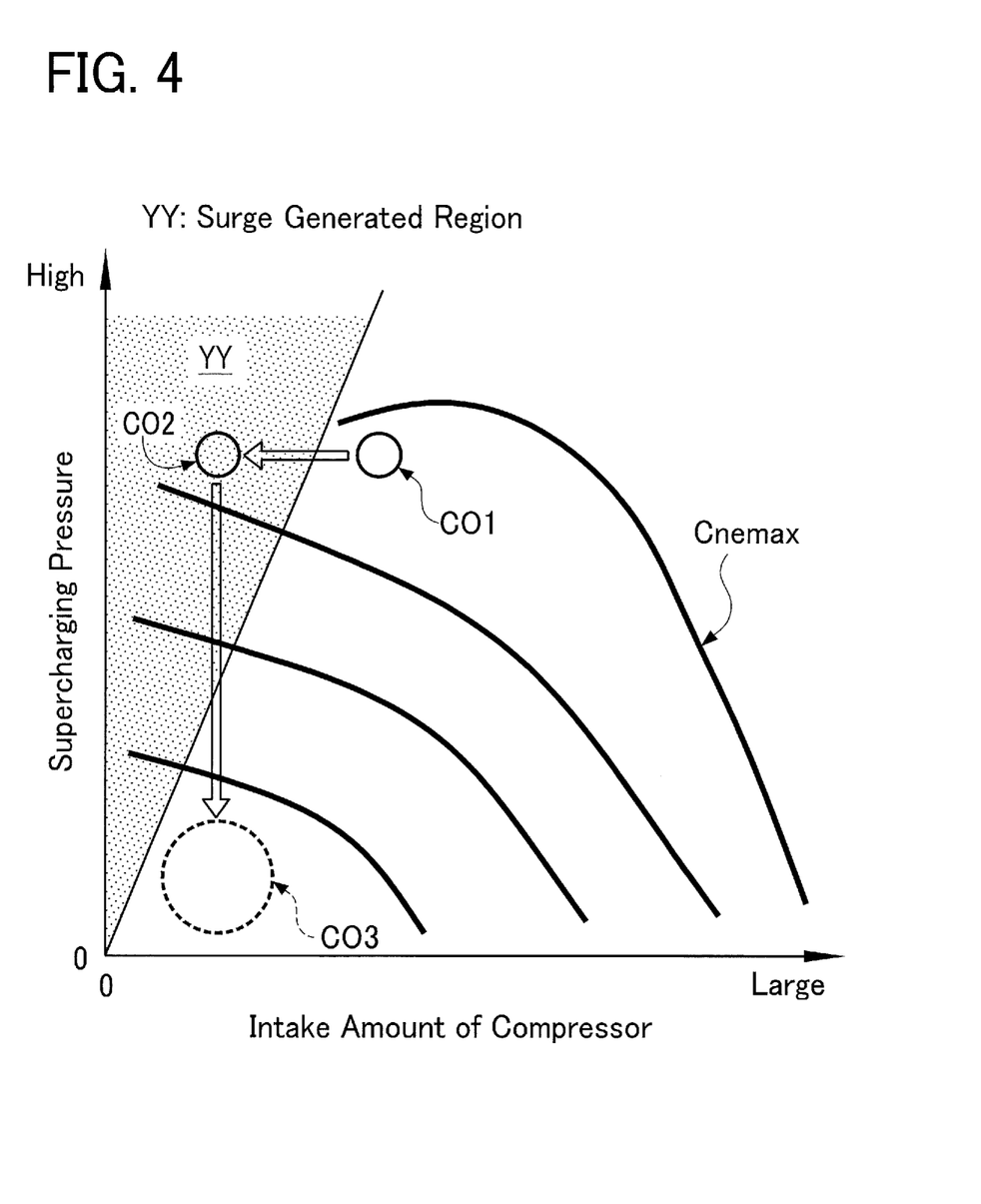
FIG. 4 is a graph showing a relation between an intake amount of intake gas passing through a compressor of the supercharger, supercharging pressure, and limited rotation speed of the compressor.

FIG. 4 is a graph showing a relation of amount of intake air passing through the compressor 8 of the supercharger 7, supercharging pressure, and a limited rotation speed Cnemax of the compressor 8. In the graph, a shaded region indicates a surge generated region where the surge is generated in the supercharger 7. It is known from this graph that the surge is generated in a region where the intake amount is relatively low. According to the intake bypass control of the present embodiment, in FIG. 4, when the deceleration operation of the engine 1 is started in a first condition CO1 outside a surge generated region, the operation condition of the engine 1 shifts to a second condition CO2 inside the surge generated region since the intake amount of the compressor 8 is reduced and the valve opening of the ABV 42 is once delayed. However, thereafter, the ABV 42 is opened and the operation condition of the engine 1 shifts to a third condition CO3 outside the surge generated region, so that the generation of surge is avoided.

Figure 5:
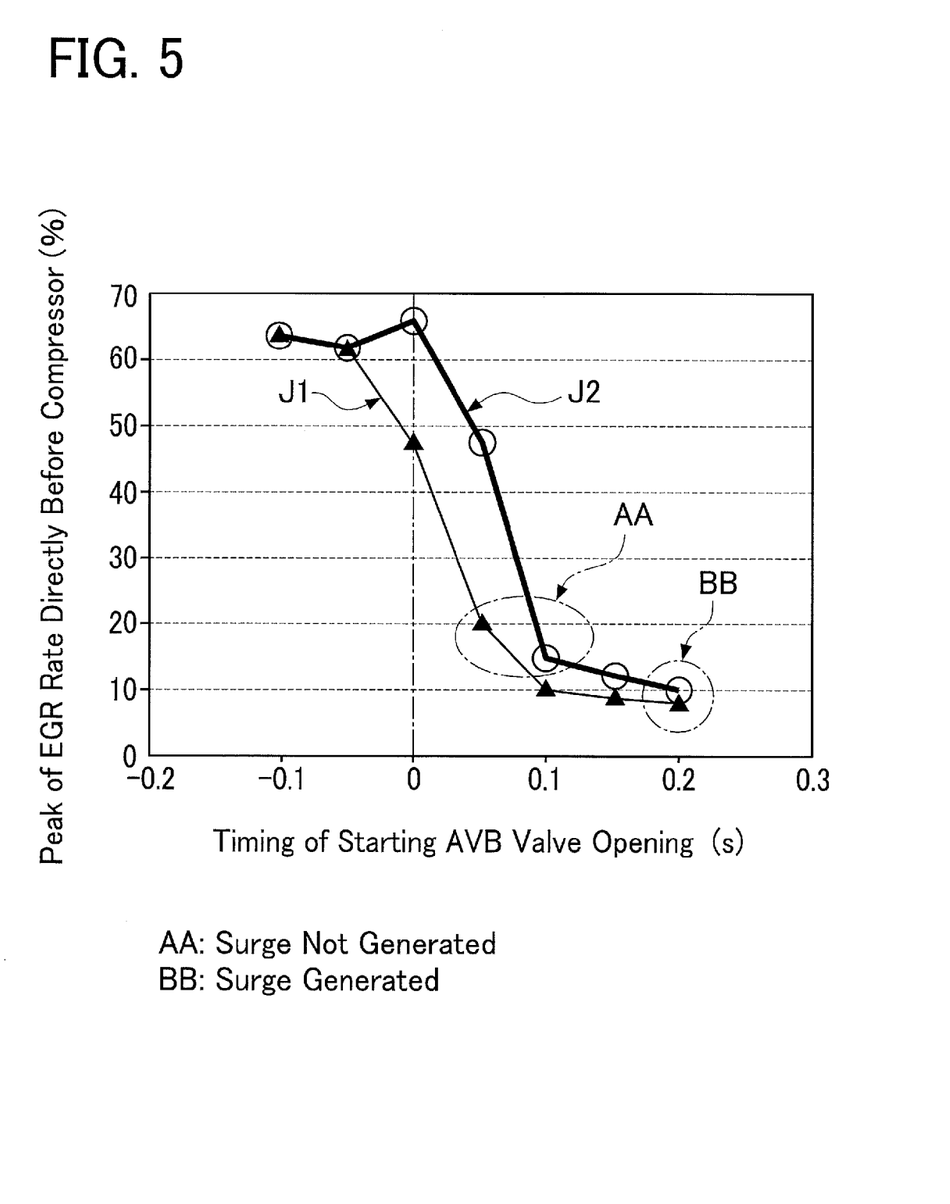
FIG. 5 is a graph showing a relation between timing of starting ABV valve opening in response to timing of starting EGR valve closing and peak of EGR rate directly before the compressor.

FIG. 5 is a graph showing a relation between timing of starting the ABV 42 opening with respect to timing of starting the EGR valve 18 closing and peak of EGR rate directly before the compressor 8. In the graph, a bar with black triangles indicates a first case J1 using the EGR valve 18 with relatively rapid valve-closing speed, and a bar with circles indicates a second case J2 using the EGR valve 18 with relatively slow valve-closing speed. In the graph, "0" in a horizontal axis indicates the timing when the EGR valve 18 starts valve closing. When the timing of starting the ABV 42 opening is moved forward from "0" in both the first and second cases J1 and J2 in the graph, the EGR rate peak reaches as high as around 60%. Meanwhile, when the timing of starting the ABV 42 opening is delayed from "0" to around "0.1 second" in both J1 and J2, the EGR rate peak is lowered to as low as "10%." From these results, it is concluded that the concentration of the EGR gas in the air circulating in the intake bypass passage 41 can be reduced. However, when the timing of starting the ABV 42 opening is delayed from "0" to "0.2 seconds" in both J1 and J2, the EGR rate peak stays as low as around "10%," but the surge could be generated in the supercharger 7. Thus, it is concluded that the timing of starting the ABV 42 opening needs to be properly delayed from the timing of starting the EGR valve 18 closing. In the present embodiment, this delayed timing is set as "the time when the EGR valve 18 is closed and the opening degree of the EGR valve 18 is equal to or less than two thirds of the valve-opened state."

The present invention is not limited to the above embodiment and may be embodied with partly changing its configuration without departing from the essential characteristics thereof.

In the above embodiment, the delay in timing of starting the ABV 42 opening from the timing of starting the EGR valve 18 closing is set at "the time when the EGR valve 18 is closed and the opening degree of the valve becomes equal to or less than two thirds of the valve opened state." Alternately, the delay in timing of starting the ABV 42 opening may be set depending on elapsed time from the timing of starting the EGR valve 18 closing.

In the above embodiment, the outlet 41*a* of the intake bypass passage 41 is configured to connect with the intake passage 3 downstream of the outlet 17*a* of the EGR passage 17. The configuration is not limited to this. Alternately, the outlet of the intake bypass passage may be connected to the intake passage on an almost same location with the outlet of the EGR passage, or the outlet of the intake bypass passage may be connected to the intake passage upstream of the outlet of the EGR passage.

While the presently preferred embodiment of the present invention has been shown and described, it is to be understood that this disclosure is for the purpose of illustration and that various changes and modifications may be made without departing from the scope of the invention as set forth in the appended claims.

INDUSTRIAL APPLICABILITY

The present invention is, for example, utilizable for a gasoline engine or diesel engine for an automobile.

REFERENCE SIGNS LIST

1 Engine
3 Intake passage
3*a* Surge tank
5 Exhaust passage
7 Supercharger
8 Compressor
9 Turbine
10 Rotary shaft
14 Electronic throttle device (intake regulating valve)
16 Combustion chamber
17 EGR passage (exhaust gas recirculation passage)
17*a* Outlet
17*b* Inlet
18 EGR valve (exhaust gas recirculation valve)
21 Throttle valve
23 Throttle sensor (operating condition detecting unit)
27 Accelerator sensor (operating condition detecting unit)
41 Intake bypass passage
41*a* Outlet
42 ABV (air bypass valve)
50 ECU (control unit)
51 Intake pressure sensor (operating condition detecting unit)
52 Rotation speed sensor (operating condition detecting unit)
53 Water temperature sensor (operating condition detecting unit)
54 Air flow meter (operating condition detecting unit)
55 Air-fuel ratio sensor (operating condition detecting unit)

What is claimed is:

1. A control device of an engine with a supercharger, the engine including:
   the supercharger provided between an intake passage and an exhaust passage of the engine and configured to increase intake pressure in the intake passage,
   the supercharger including a compressor placed in the intake passage, a turbine placed in the exhaust passage, and a rotary shaft connecting the compressor and the turbine so that the compressor and the turbine are integrally rotatable;
   an exhaust gas recirculation apparatus including an exhaust recirculation passage configured to allow part of exhaust gas discharged from a combustion chamber of the engine to the exhaust passage to flow as exhaust recirculation gas to the intake passage and return to the combustion chamber and an exhaust recirculation valve configured to regulate a flow of the exhaust recirculation gas in the exhaust recirculation passage,
   the exhaust recirculation passage having an inlet connected to the exhaust passage downstream of the turbine and an outlet connected to the intake passage upstream of the compressor;
   an intake regulating valve configured to regulate intake amount in the intake passage;
   an intake bypass passage configured to bypass the intake passage downstream of the compressor and the intake passage upstream of the compressor;
   an air bypass valve configured to open and close the intake bypass passage;
   an operating condition detecting unit configured to detect operating condition of the engine; and
   a control unit configured to control at least the exhaust recirculation valve and the air bypass valve based on the detected operating condition;
   the intake regulating valve being configured to open during acceleration operation or during steady operation of the engine and to close during stop operation or during deceleration operation of the engine,
   wherein the control unit is configured such that, when the control unit determines based on the detected operating condition that the exhaust recirculation valve is in a valve-opened state and that the engine is in the deceleration operation from a supercharging region where the supercharger is operated, the control unit controls the exhaust recirculation valve to close and controls the air bypass valve to open from a closed state with a delay from start of closing the exhaust recirculation valve.

2. The control device of an engine with a supercharger according to claim 1, wherein the intake bypass passage has an outlet connected to the intake passage downstream of the outlet of the exhaust recirculation passage.

3. The control device of an engine with a supercharger according to claim 1, wherein the control unit is configured to cause the exhaust recirculation valve to close, and cause the air bypass valve to start opening when an opening degree of the exhaust recirculation valve is equal to or less than two thirds of the opening degree in the valve-opened state.

4. The control device of an engine with a supercharger according to claim 3, wherein the intake bypass passage has an outlet connected to the intake passage downstream of the outlet of the exhaust recirculation passage.

5. The control device of an engine with a supercharger according to claim 1, wherein the control unit is configured to cause the air bypass valve to start opening preceding to completion of closing the intake regulating valve when the engine is determined to be in the deceleration operation.

6. The control device of an engine with a supercharger according to claim 5, wherein the intake bypass passage has an outlet connected to the intake passage downstream of the outlet of the exhaust recirculation passage.

7. The control device of an engine with a supercharger according to claim 5, wherein the control unit is configured to cause the exhaust recirculation valve to close, and cause the air bypass valve to start opening when an opening degree of the exhaust recirculation valve is equal to or less than two thirds of the opening degree in the valve-opened state.

8. The control device of an engine with a supercharger according to claim 7, wherein the intake bypass passage has an outlet connected to the intake passage downstream of the outlet of the exhaust recirculation passage.

* * * * *